No. 709,696. Patented Sept. 23, 1902.
G. BRUECK.
RADIANT HEAT BATH.
(Application filed Mar. 12, 1902.)
(No Model.) 2 Sheets—Sheet 1.

Witnesses:
John A. Rennie
Henry Suhrbier

Inventor
George Brueck
by Goepel & Niles,
Attorneys

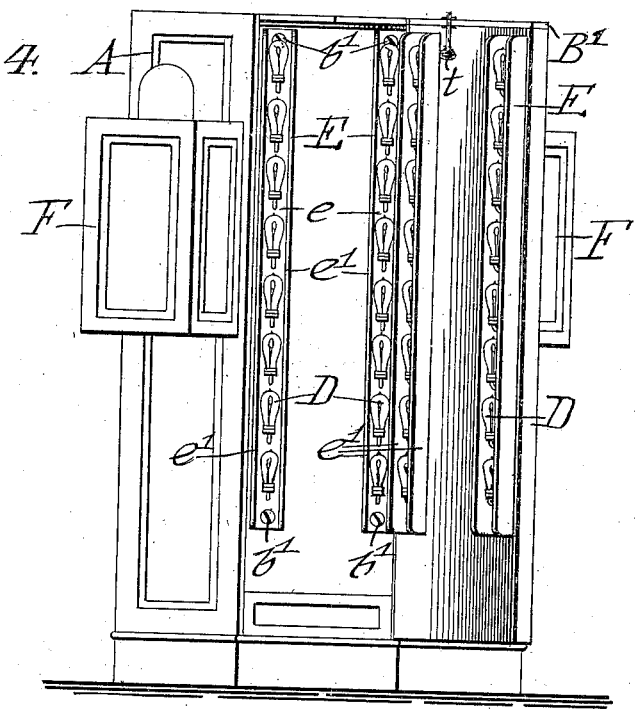
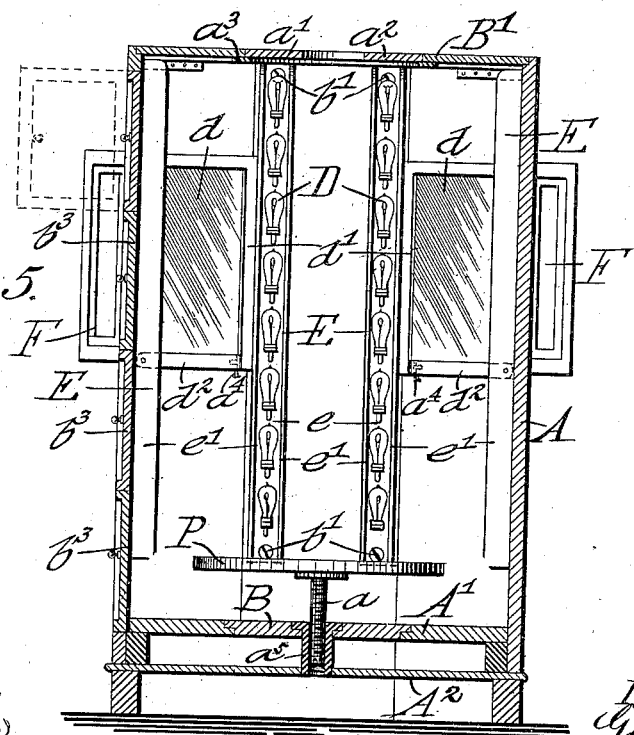

UNITED STATES PATENT OFFICE.

GEORGE BRUECK, OF NEW YORK, N. Y.

RADIANT-HEAT BATH.

SPECIFICATION forming part of Letters Patent No. 709,696, dated September 23, 1902.

Application filed March 12, 1902. Serial No. 97,941. (No model.)

*To all whom it may concern:*

Be it known that I, GEORGE BRUECK, a citizen of the Empire of Germany, residing in New York, borough of Manhattan, and State of New York, have invented certain new and useful Improvements in Radiant-Heat Baths, of which the following is a specification.

This invention relates to an improved apparatus for the treatment of rheumatism, nerve troubles, skin diseases, &c., by the action of radiant heat obtained from electric incandescent, arc, or other light sources, to which either the entire body or portions thereof are exposed either singly or jointly; and for this purpose the invention consists of a radiant-heat bath which comprises a casing of suitable size provided with a hinged door for giving admission to the interior of the same, said casing being provided at the interior of its sides with rows of incandescent electric lamps, reflecting-surfaces for the rays from said lamps, and guard-ribs for protecting the lamps, said casing being further provided at intermediate sides with extensions containing larger incandescent lamps and reflectors, and colored screen-plates in front of the same, so as to utilize the action of any desired light-rays of the spectrum, said casing being provided in one of its sides with small hinged doors one below the other, any one of which is adapted to be opened at a time, so as to permit passage of the rays of an arc-lamp through the openings thus formed into the interior of the casing, said arc-lamp being supported at a suitable height outside of the casing.

Figure 1:
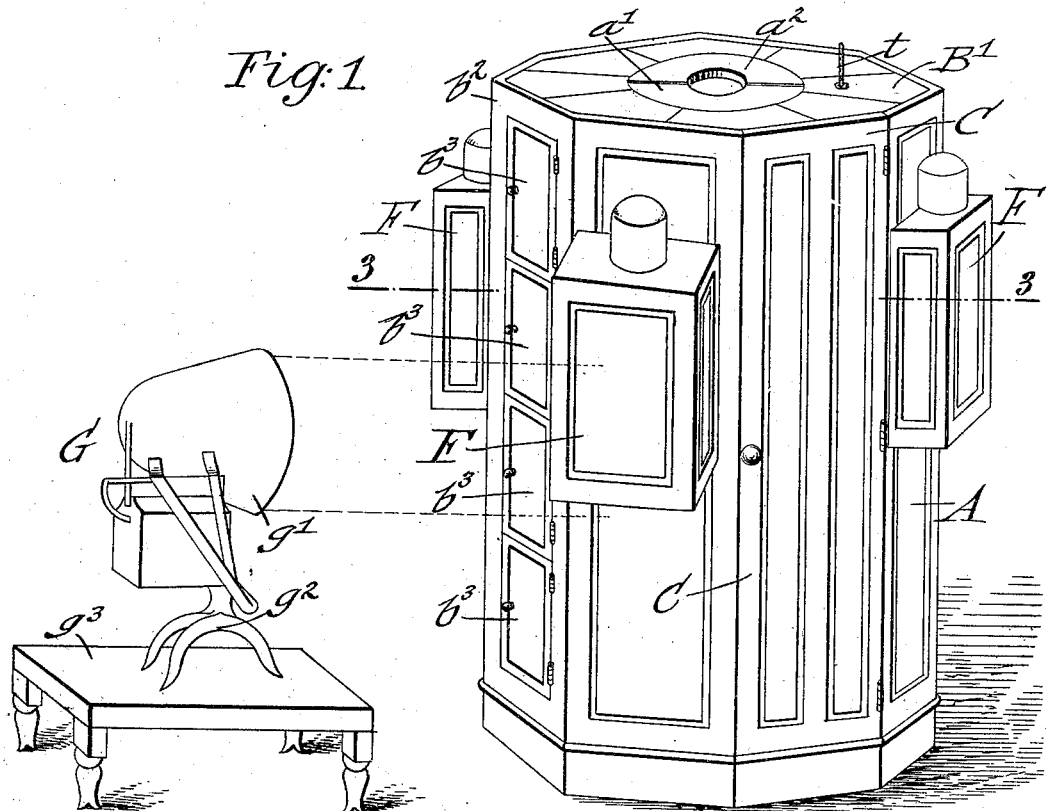
Figure 2:
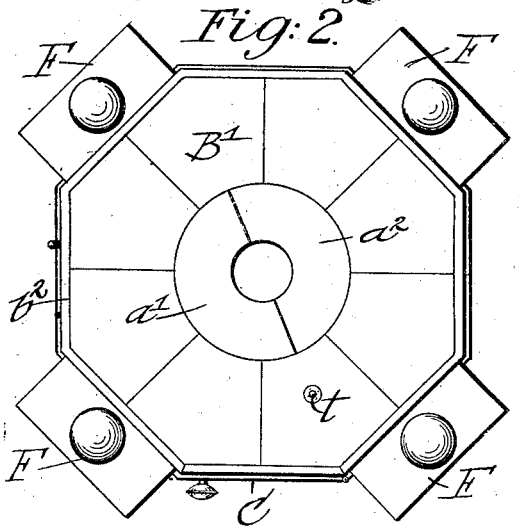
Figure 3:
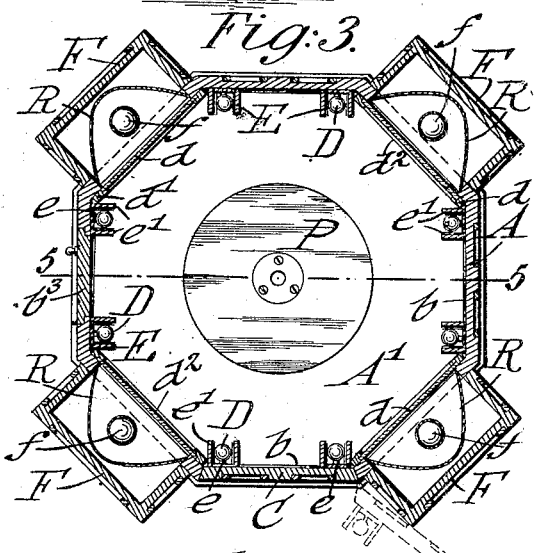

In the accompanying drawings, Figure 1 is a perspective view of my improved radiant-heat bath. Fig. 2 is a plan view of Fig. 1. Fig. 3 is a horizontal section on line 3 3, Fig. 1. Fig. 4 is a front view with two adjacent casing-walls removed; and Fig. 5 is a vertical central section on line 5 5, Fig. 3.

Similar letters of reference indicate corresponding parts.

Referring to the drawings, A represents a casing, which is made of wood or other suitable material and of sufficient size so that a person can stand in the same when the adjustable bottom platform B is removed or sit in the same when a chair is placed on an auxiliary rotatable platform P, provided with a screw-threaded supporting spindle or shank $a$, engaging a correspondingly-threaded socket or sleeve $a^5$ of the platform B.

The casing is preferably made of octagonal shape and one of the eight sides is hinged and forms a suitable door C, so as to permit ingress and egress. The inner surface of the sides of the casing are covered by a white enamel coating or plate $b$ of any suitable reflecting material. Along the sides of the casing A are arranged rows of incandescent electric lights D, preferably in vertical line, the lamps of each row located in a channeled support E, composed of a base $e$ and ribs or sides $e'$ at both sides of the lamps, so as to prevent contact of the person with the lamps or the breaking or injury of the lamps. Two rows of lamps are arranged on each closed side of the casing and the rows are arranged at the edges of said sides, so that all the rows are approximately the same distance apart, whereby when the arc-lights are not employed the incandescent light is distributed uniformly throughout the casing. The electric connections are preferably arranged on the strips, the lamps being wired in the usual manner, and the entire row of lamps can be removed at the same time by loosening the fastening-screws $b'$ whenever necessary for the purpose of repairs. The guard-strips $e'$ and base-strip $e$ may be provided with reflecting-surfaces at the sides adjacent the lamps, and the base-strip $e$ is provided at each end with a perforation for a fastening-screw by which the entire support is secured detachably to the casing. The casing A is preferably constructed so that the side walls can be readily taken apart for packing and shipping and also for the purpose of being used not only in upright, but also in horizontal position, in connection with suitable supporting-stands, in which latter case a suitable bench or lounge is placed between the two sections and on which the patient can be treated in reclining position.

The bottom A' is firmly supported in the lower part of the casing A and provided at the center with an opening into which the bottom platform B fits easily, so that the latter can be inserted or removed, according as the apparatus is to be used for the patient standing or sitting. A false bottom $A^2$ is arranged below the bottom A' and the socket $a'$ is partially supported thereby. The top of the apparatus is provided at the center with two removable semicircular neck-pieces $a'$ $a^2$, which can be removed so as to permit the head of the patient to pass through the opening in the top B' of the casing and replaced around the neck by the attendant or by the patient himself in case the bath is taken without an attendant. The semicircular sections $a'$ $a^2$ are held in position by means of cleats $a^3$, attached to the top B'. A thermometer $t$ extends through the top B'.

In some of the sides of the casing A are arranged rectangular openings, which may be closed by means of interchangeable glass plates $d$, guided in the cleats $d'$. Opposite said openings extensions F project outwardly from the casing A, as shown in Fig. 1. At the interior of each extension is arranged one or more incandescent lamps $f$, of larger size than the lamps D, and back of each lamp $f$ is located a powerful parabolic reflector R, as shown clearly in horizontal section in Fig. 3. The colored-glass plates $d$ serve in the nature of screens for absorbing some of the rays from the lamps $f$, while permitting the remaining rays, and especially the actinic rays, to pass through, so as to be utilized for the treatment of special diseases. When it is not desired to use these colored screens, they may be removed by releasing a suitable spring-catch $a^4$ and swinging down the hinged lower supporting-cleat $d^2$, as indicated, whereby the screen-plate is released and slides in downward direction by its own gravity, so as to be readily removed.

One of the sides of the casing A—as, for example, the side $b^2$—is provided with a number of hinged doors $b^3$ of small size, which are arranged one above the other, so that either door can be opened at a time while the remaining ones are closed. These doors are arranged for the purpose of permitting the use of rays from a powerful arc-lamp G, which is arranged outside of the casing and inclosed by a parabolic reflector $g'$, said arc-lamp being arranged on a suitable stand $g^2$, that is supported on a table $g^3$ of proper size, so that the rays can be directed into any one of the openings formed by opening the doors $b^3$, so that the light is thrown through the opening to the proper portion of the body of the patient in the casing. In place of the arc-lamp an apparatus for producing X-rays may be used if X-ray treatment is desired, or any other source for producing rays of therapeutic value for the treatment of disease may be used.

My improved radiant-heat bath is used as follows: The platform P is either removed or inserted according as the bath is to be given to the patient in standing or sitting position. If it is to be given in sitting position, a chair is placed on the platform and the latter adjusted to such a height that the head of the patient projects through the top of the casing to the outside. The current is then turned on either to all or a portion of the lamps in the casing, or one row of lights after the other may be turned on, so as to increase the light and heat effect of the rays on the body of the patient by degrees. If the lamps in the extensions are to be used, they are likewise thrown into circuit, so as to be utilized either with or without the colored screens, according to the treatment required. If the rays of an arc-light or other rays are to be used, the exterior source of light is adjusted to the proper height of the portion of the body to be treated and the corresponding door opened so that the body of the patient can be exposed to the rays for the proper length of time.

My improved bath apparatus can be used either by physicians or by any one who desires a radiant-heat bath at his own home, as the apparatus can be readily used by the patient himself without other attention. The apparatus is so constructed that it can be furnished at reasonable cost to persons for whom such treatment is prescribed and who do not live within reach of a specialist. I am well aware that similar radiant-heat baths have been used before; but they are so constructed that the bath can only be administered by a special attendant.

Having thus described my invention, I claim as new and desire to secure by Letters Patent—

1. In a radiant-heat bath, the combination of an exterior polygonal casing having an opening in one of its sides, a plurality of hinged outwardly-swinging doors, one above the other, for closing said opening, two vertical rows of incandescent electric lamps arranged on said side of the casing, one row at each side of the doors, reflectors for throwing the light from said lamps inwardly into the casing, and an electric-arc lamp adjustably supported outside of said casing and provided with a reflector for throwing the rays of light therefrom through said openings, substantially as set forth.

2. In a radiant-heat bath, the combination, of an upright casing of regular polygonal cross-section having alternate sides provided with extended portions at a suitable height and in communication with the interior of the casing, interior rows of incandescent lamps arranged vertically along the edges of the intermediate sides, interchangeable screen devices for said extended portions, sources of light in said extended portions, one of said intermediate sides forming an entrance-door, and another intermediate side having a plurality of vertically-arranged doors adapted to open independently for the admission of light from an exterior source, substantially as set forth.

In testimony that I claim the foregoing as my invention I have signed my name in presence of two subscribing witnesses.

GEORGE BRUECK.

Witnesses:
PAUL GOEPEL,
JOSEPH H. NILES.